United States Patent
Yu et al.

(10) Patent No.: US 12,050,832 B2
(45) Date of Patent: Jul. 30, 2024

(54) SCREENSHOT DISPLAY METHOD AND APPARATUS, AND TERMINAL DEVICE

(71) Applicant: HUAWEI TECHNOLOGIES CO., LTD., Shenzhen (CN)

(72) Inventors: Mailin Yu, Nanjing (CN); Yun Ye, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 65 days.

(21) Appl. No.: 17/778,642

(22) PCT Filed: Oct. 28, 2020

(86) PCT No.: PCT/CN2020/124485
§ 371 (c)(1),
(2) Date: May 20, 2022

(87) PCT Pub. No.: WO2021/098460
PCT Pub. Date: May 27, 2021

(65) Prior Publication Data
US 2022/0413787 A1    Dec. 29, 2022

(30) Foreign Application Priority Data
Nov. 22, 2019    (CN) .......................... 201911155018.8

(51) Int. Cl.
*G06T 17/00*    (2006.01)
*G06F 3/14*    (2006.01)
*H04M 1/02*    (2006.01)

(52) U.S. Cl.
CPC ............ *G06F 3/1423* (2013.01); *G06T 17/00* (2013.01); *H04M 1/0216* (2013.01); *H04M 2250/16* (2013.01)

(58) Field of Classification Search
CPC .......... G09G 5/37; G09G 5/38; G06F 3/1423; G06T 17/00; H04M 1/0216; H04M 2250/16
See application file for complete search history.

(56) References Cited

U.S. PATENT DOCUMENTS 9,471,201 B1    10/2016    Truong et al.
2010/0321275 A1    12/2010    Hinckley et al.
(Continued)

FOREIGN PATENT DOCUMENTS

CN    104536661 A    4/2015
CN    107562345 A    1/2018
(Continued)

OTHER PUBLICATIONS

Translation of CN109542306 obtained Nov. 1, 2023 via Espacenet https://translationportal.epo.org/emtp/translate/?ACTION=description-retrieval&COUNTRY=CN&ENGINE=google&FORMAT=docdb&KIND=A&LOCALE=en_EP&NUMBER=109542306&OPS=ops.epo.org/3.2&SRCLANG=zh&TRGLANG=en (Year: 2019).*

*Primary Examiner* — Antonio A Caschera
(74) *Attorney, Agent, or Firm* — Rimon PC

(57) ABSTRACT

Embodiments of this application is applicable to the field of terminal technologies, and in particular, to an artificial intelligence terminal-based screenshot display method and apparatus, and a terminal device. The screenshot display method is applied to a terminal device having a foldable screen. The foldable screen includes a first display and a second display. The screenshot display method includes: obtaining a first included angle between the first display and the second display; performing a screen capturing operation on current display content of each of the first display and the second display, to obtain a first screenshot corresponding to the first display and a second screenshot corresponding to
(Continued)

Obtain a first included angle between a first display and a second display, and perform a screen capturing operation on current display content of each of the first display and the second display, to obtain a first screenshot corresponding to the first display and a second screenshot corresponding to the second display  ⟶ S301

Display the first screenshot and the second screenshot based on the first included angle  ⟶ S302 the second display; and displaying the first screenshot and the second screenshot based on the first included angle.

20 Claims, 8 Drawing Sheets

(56) References Cited

U.S. PATENT DOCUMENTS

| | | | |
|---|---|---|---|
| 2014/0098188 | A1 | 4/2014 | Kwak et al. |
| 2016/0189386 | A1 | 6/2016 | Michaelraj et al. |
| 2016/0283014 | A1 | 9/2016 | Rider et al. |
| 2016/0299579 | A1 | 10/2016 | Kim et al. |
| 2017/0255442 | A1 | 9/2017 | Kim et al. |
| 2022/0254103 | A1* | 8/2022 | Xu .......................... G06F 3/14 |
| 2023/0044497 | A1* | 2/2023 | Zhang .................. G06F 3/0482 |

FOREIGN PATENT DOCUMENTS

| | | |
|---|---|---|
| CN | 107682622 A | 2/2018 |
| CN | 107765952 A | 3/2018 |
| CN | 108055411 A | 5/2018 |
| CN | 108089808 A | 5/2018 |
| CN | 109358793 A | 2/2019 |
| CN | 109542306 A | 3/2019 |
| CN | 109739421 A | 5/2019 |
| CN | 110012154 A | 7/2019 |
| CN | 110231973 A | 9/2019 |
| CN | 110347316 A | 10/2019 |
| CN | 110673889 A | 1/2020 |
| CN | 110209326 B | 12/2020 |
| EP | 2743133 A2 | 6/2014 |
| JP | 2012123205 A | 6/2012 |
| JP | 2014505315 A | 2/2014 |
| JP | 2014078234 A | 5/2014 |

* cited by examiner

SCREENSHOT DISPLAY METHOD AND APPARATUS, AND TERMINAL DEVICE

This application is a National Stage of International Application No. PCT/CN2020/124485, filed on Oct. 28, 2020, which claims priority to Chinese Patent Application No. 201911155018.8, filed Nov. 22, 2019, both of which are hereby incorporated by reference in their entireties.

TECHNICAL FIELD

This application belongs to the field of terminal technologies, and in particular, to an artificial intelligence (AI) terminal-based screenshot display method and apparatus, and a terminal device.

BACKGROUND

With the continuous development of foldable screen technologies, terminal devices having foldable screens are gradually being introduced to the market. Like a conventional terminal device, the terminal device having a foldable screen also has a screen capturing function and a screen recording function. That is, when browsing content such as a text or an image by using the terminal device having a foldable screen, a user can capture or record currently displayed content on a display and store the content for subsequent viewing by using the screenshot capturing or screen recording function.

When performing screen capturing or screen recording, the existing terminal device having a foldable screen usually captures an image corresponding to each screen, integrates the image corresponding to each screen into a complete plane image based on a connection relationship between the screens, and stores the complete plane image. When the screenshot is displayed, the complete plane image is displayed directly. The existing screenshot display manner does not fully reflect a display characteristic of the terminal device having a foldable screen, resulting in a poor screenshot display effect of the terminal device having a foldable screen.

SUMMARY

Embodiments of this application provide a screenshot display method and apparatus, and a terminal device, to resolve a poor screenshot display effect of an existing terminal device having a foldable screen.

According to a first aspect, an embodiment of this application provides a screenshot display method, applied to a terminal device having a foldable screen, where the foldable screen includes a first display and a second display. The screenshot display method may include:

obtaining a first included angle between the first display and the second display, and performing a screen capturing operation on current display content of each of the first display and the second display, to obtain a first screenshot corresponding to the first display and a second screenshot corresponding to the second display; and displaying the first screenshot and the second screenshot based on the first included angle.

It should be noted that a resistance sensor may be disposed in a bendable area between the first display and the second display, to obtain the first included angle between the first display and the second display based on a resistance change measured by the resistance sensor. Alternatively, a gravity sensor/gyroscope sensor may be disposed in each of the first display and the second display, so that the first included angle between the first display and the second display is measured and obtained through the gravity sensors/gyroscope sensors in the first display and the second display.

It should be understood that, performing the screen capturing operation on the current display content of the first display may comprise performing the screen capturing operation on all the current display content of the first display, that is, capturing the entire first display, or may comprise performing the screen capturing operation on a part of the current display content of the first display, that is, capturing a part of the first display. Similarly, performing the screen capturing operation on the current display content of the second display may comprise performing the screen capturing operation on all the current display content of the second display, or performing the screen capturing operation on a part of the current display content of the second display.

In a possible implementation of the first aspect, the displaying the first screenshot and the second screenshot based on the first included angle may include:

determining, based on the first included angle, a first plane corresponding to the first screenshot and a second plane corresponding to the second screenshot, where a second included angle between the first plane and the second plane is the same as the first included angle;

separately determining a first plane area in the first plane and a second plane area in the second plane based on the first display and the second display; and displaying the first screenshot in the first plane area, and displaying the second screenshot in the second plane area.

For example, the first plane area in the first plane may be determined based on a first screen size of the first display and a preset scaling ratio, and the second plane area in the second plane may be determined based on a second screen size of the second display and the preset scaling ratio. The first plane area is connected to the second plane area.

Specifically, the displaying the first screenshot in the first plane area, and displaying the second screenshot in the second plane area may include:

determining a first display location of the first screenshot in the first display area based on first location information of the first screenshot in the first display;

determining a second display location of the second screenshot in the second plane area based on second location information of the second screenshot in the second display; and displaying the first screenshot in the first display location, and displaying the second screenshot in the second display location.

It should be noted that the first location information of the first screenshot in the first display may be determined, recorded and stored during screen capturing. Similarly, the second location information of the second screenshot in the second display may also be determined, recorded and stored during screen capturing.

In a possible implementation of the first aspect, the displaying the first screenshot and the second screenshot based on the first included angle may include:

obtaining, based on the first included angle, a three-dimensional model corresponding to the terminal device, where the three-dimensional model includes a first display area corresponding to the first display and a second display area corresponding to the second display, and a third included angle between the first display area and the second display area is the same as the first included angle;

rendering the first screenshot to the first display area of the three-dimensional model, and rendering the second screenshot to the second display area of the three-dimensional model; and displaying the three-dimensional model.

It should be understood that, a plurality of three-dimensional models corresponding to the terminal device may be constructed in advance based on a foldable angle of the foldable screen of the terminal device, and a correspondence between the constructed three-dimensional models and the foldable angle may be established at the same time. In this way, when a screenshot is displayed, a three-dimensional model corresponding to the first included angle may be obtained based on the correspondence, and three-dimensional display of the screenshot is performed by using the three-dimensional model.

Specifically, the displaying the three-dimensional model may include:

determining a display angle corresponding to the three-dimensional model, and displaying the three-dimensional model based on the display angle.

For example, an angle directly facing the first display may be determined as the display angle, or an angle directly facing the second display may be determined as the display angle, or an angle directly facing the bendable area between the first display and the second display may be determined as the display angle.

It should be understood that the display angle may be determined based on a preset correspondence between the three-dimensional model and the display angle, where the preset correspondence may be established when the three-dimensional model is constructed. For example, when the three-dimensional model is constructed, the preset correspondence may be established based on a correspondence set by a user. For another example, when the three-dimensional model is constructed, the preset correspondence may be established based on a current display angle of an image in the terminal device.

In another possible implementation of the first aspect, the displaying the first screenshot and the second screenshot based on the first included angle may include:

obtaining attribute information corresponding to the terminal device;

drawing, based on the attribute information and the first included angle, a three-dimensional model corresponding to the terminal device, where the three-dimensional model includes a first display area corresponding to the first display and a second display area corresponding to the second display, and a fourth included angle between the first display area and the second display area is the same as the first included angle;

rendering the first screenshot to the first display area of the three-dimensional model, and rendering the second screenshot to the second display area of the three-dimensional model; and displaying the three-dimensional model.

It should be noted that the three-dimensional model corresponding to the terminal device may be constructed by using a 3D rendering engine. The attribute information may include information such as appearances of the first display and the second display in the terminal device. The 3D rendering engine may draw, based on the attribute information and the first included angle, the three-dimensional model corresponding to the terminal device.

In a possible implementation of the first aspect, the displaying the first screenshot and the second screenshot based on the first included angle may include:

obtaining a fifth included angle between the first display and the second display;

if the fifth included angle is the same as the first included angle, displaying the first screenshot in the first display, and displaying the second screenshot in the second display; and if the fifth included angle is different from the first included angle, outputting an adjustment instruction based on the first included angle and the fifth included angle, to instruct a user to adjust the first display and/or the second display.

In another possible implementation of the first aspect, the displaying the first screenshot and the second screenshot based on the first included angle may include:

obtaining a fifth included angle between the first display and the second display;

if the fifth included angle is the same as the first included angle, displaying the first screenshot in the first display, and displaying the second screenshot in the second display; and if the fifth included angle is different from the first included angle, displaying the first screenshot and the second screenshot based on the first included angle.

It should be understood that, in this embodiment of this application, a screenshot may be displayed based on a current folded state of the terminal device. Specifically, when the current folded state of the terminal device is the same as a folded state when the screen capturing operation is performed, the first screenshot may be directly displayed on the first display of the terminal device, and the second screenshot may be directly displayed on the second display of the terminal device. That is, a three-dimensional display of the screenshot may be implemented directly based on the terminal device, instead of constructing or obtaining the three-dimensional model. However, when the current folded state of the terminal device is different from the folded state when the screen capturing operation is performed, an adjustment instruction may be output to instruct the user to adjust the folded state of the terminal device, or the three-dimensional model is constructed or obtained, and then the three-dimensional display of the screenshot is performed based on the three-dimensional model.

Optionally, the screenshot display method may further include:

constructing a first timeline corresponding to the first included angle and a second timeline corresponding to the first screenshot and the second screenshot, where the first timeline corresponds to the second timeline; and the displaying the first screenshot and the second screenshot based on the first included angle includes:

obtaining the first screenshot and the second screenshot based on the second timeline, and obtaining, based on the first timeline, the first included angle corresponding to the first screenshot and the second screenshot; and displaying the first screenshot and the second screenshot based on the first included angle.

It should be noted that, in a continuous screen capturing scenario, a timeline may be constructed. That is, when a screenshot and a first included angle are obtained, a first timeline corresponding to the first included angle and a second timeline corresponding to the screenshot may be constructed. The first timeline is consistent with the second timeline, so that each frame of screenshot may be obtained based on the second timeline corresponding to the screenshot, and the first included angle corresponding to each frame of the screenshot may be determined based on the first timeline corresponding to the first included angle. Therefore, a continuous three-dimensional display of each frame of the screenshot may be performed based on the first included angle corresponding to each frame of screenshot.

According to a second aspect, an embodiment of this application provides a screenshot display apparatus, used in a terminal device having a foldable screen, where the foldable screen includes a first display and a second display. The screenshot display apparatus includes:

a screen capturing module, configured to obtain a first included angle between the first display and the second display, and perform a screen capturing operation on current display content of each of the first display and the second display, to obtain a first screenshot corresponding to the first display and a second screenshot corresponding to the second display; and a display module, configured to display the first screenshot and the second screenshot based on the first included angle.

In a possible implementation of the second aspect, the display module includes:

a plane determining unit, configured to determine, based on the first included angle, a first plane corresponding to the first screenshot and a second plane corresponding to the second screenshot, where a second included angle between the first plane and the second plane is the same as the first included angle;

an area determining unit, configured to separately determine a first plane area in the first plane and a second plane area in the second plane based on the first display and the second display; and a first display unit, configured to display the first screenshot in the first plane area, and display the second screenshot in the second plane area.

Optionally, the first display unit includes:

a first location determining subunit, configured to determine a first display location of the first screenshot in the first display area based on first location information of the first screenshot in the first display;

a second location determining subunit, configured to determine a second display location of the second screenshot in the second plane area based on second location information of the second screenshot in the second display; and a first display subunit, configured to display the first screenshot in the first display location, and display the second screenshot in the second display location.

In a possible implementation of the second aspect, the display module includes:

a model obtaining unit, configured to obtain, based on the first included angle, a three-dimensional model corresponding to the terminal device, where the three-dimensional model includes a first display area corresponding to the first display and a second display area corresponding to the second display, and a third included angle between the first display area and the second display area is the same as the first included angle;

a first image rendering unit, configured to render the first screenshot to the first display area of the three-dimensional model, and render the second screenshot to the second display area of the three-dimensional model; and a second display unit, configured to display the three-dimensional model.

For example, the second display unit is specifically configured to determine a display angle corresponding to the three-dimensional model, and display the three-dimensional model based on the display angle.

In another possible implementation of the second aspect, the display module includes:

an attribute information obtaining unit, configured to obtain attribute information corresponding to the terminal device;

a model construction unit, configured to draw, based on the attribute information and the first included angle, a three-dimensional model corresponding to the terminal device, where the three-dimensional model includes a first display area corresponding to the first display and a second display area corresponding to the second display, and a fourth included angle between the first display area and the second display area is the same as the first included angle;

a second image rendering unit, configured to render the first screenshot to the first display area of the three-dimensional model, and render the second screenshot to the second display area of the three-dimensional model; and a third display unit, configured to display the three-dimensional model.

In a possible implementation of the second aspect, the display module includes:

a first included angle obtaining unit, configured to obtain a fifth included angle between the first display and the second display;

a fourth display unit, configured to: if the fifth included angle is the same as the first included angle, display the first screenshot in the first display, and display the second screenshot in the second display; and an instruction output unit, configured to: if the fifth included angle is different from the first included angle, output an adjustment instruction based on the first included angle and the fifth included angle, to instruct a user to adjust the first display and/or the second display.

In another possible implementation of the second aspect, the display module includes:

a second included angle obtaining unit, configured to obtain a fifth included angle between the first display and the second display;

a fifth display unit, configured to: if the fifth included angle is the same as the first included angle, display the first screenshot in the first display, and display the second screenshot in the second display; and a sixth display unit, configured to: if the fifth included angle is different from the first included angle, display the first screenshot and the second screenshot based on the first included angle.

Optionally, the screenshot display apparatus further includes:

a timeline construction module, configured to construct a first timeline corresponding to the first included angle and a second timeline corresponding to the first screenshot and the second screenshot, where the first timeline corresponds to the second timeline.

Correspondingly, the display module further includes:

a third included angle obtaining unit, configured to obtain the first screenshot and the second screenshot based on the second timeline, and obtain, based on the first timeline, the first included angle corresponding to the first screenshot and the second screenshot; and a seventh display unit, configured to display the first screenshot and the second screenshot based on the first included angle.

According to a third aspect, an embodiment of this application provides a terminal device, including a foldable screen, a sensor, a memory, a processor, and a computer program that is stored in the memory and that can be run on the processor. When executing the computer program, the processor implements the screenshot display method according to any one of the first aspect or the possible implementations of the first aspect.

According to a fourth aspect, an embodiment of this application provides a computer-readable storage medium. The computer-readable storage medium stores a computer program. When the computer program is executed by a processor, the screenshot display method according to any one of the first aspect or the possible implementations of the first aspect is implemented.

According to a fifth aspect, an embodiment of this application provides a computer program product. When the computer program product runs on a terminal device, the terminal device is enabled to perform the screenshot display method according to any one of the first aspect or the possible implementations of the first aspect.

It may be understood that, for beneficial effects of the second aspect to the fifth aspect, refer to related descriptions in the first aspect. Details are not described herein again.

Compared with the conventional technology, embodiments of this application have the following beneficial effects.

In embodiments of this application, when a screen capturing instruction is received, the first included angle between the first display and the second display may be first obtained, and the screen capturing operation may be performed on the current display content of each of the first display and the second display, to obtain the first screenshot corresponding to the first display and the second screenshot corresponding to the second display. Then, the first screenshot and the second screenshot may be displayed based on the first included angle. That is, in embodiments of this application, during screen capturing, the first included angle between the first display and the second display may be obtained, so that when the screenshot is displayed, the three-dimensional display of the first screenshot and the second screenshot may be performed based on the first included angle, to fully reflect folding and bending characteristics of the terminal device having a foldable screen, implement the three-dimensional display of the screenshot, and improve a display effect of the screenshot.

DESCRIPTION OF EMBODIMENTS

Figure 1:
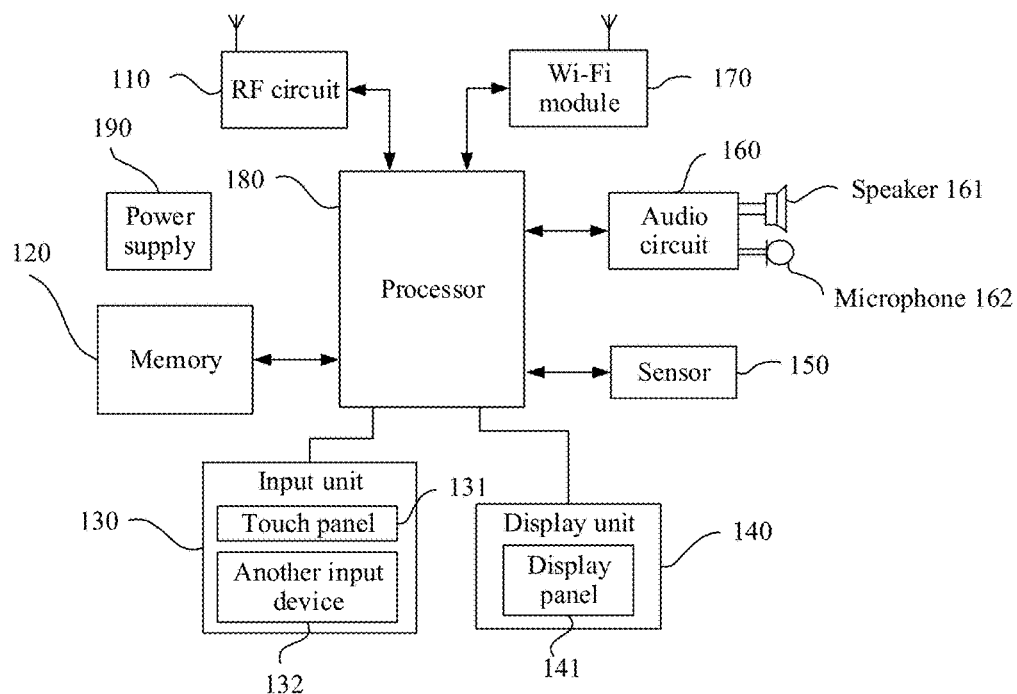
FIG. 1 is a schematic diagram of a structure of a mobile phone to which a screenshot display method is applicable according to an embodiment of this application.

In the following description, to illustrate rather than limit a particular system structure, and a technology, specific details are provided to make a thorough understanding of embodiments of this application. However, persons skilled in the art should know that this application may also be implemented in other embodiments without these specific details. In other cases, detailed descriptions of well-known systems, apparatuses, circuits, and methods are omitted, so that this application is described without being obscured by unnecessary details.

It should be understood that, when used in the specification and claims of this application, the term "including" indicates presence of described features, entireties, steps, operations, elements, and/or components, but does not exclude presence or addition of one or more other features, entireties, steps, operations, elements, components, and/or collections thereof.

It should be further understood that the term "and/or" used in the specification and claims of this application indicates any combination and all possible combinations of one or more items listed in association, and includes the combinations.

As used in the specification and claims of this application, the term "if" may be interpreted as "when", "once", "in response to determining", or "in response to detecting" depending on the context. Similarly, the phrase "if it is determined" or "if the [described condition or event] is detected" may be interpreted as meaning "once determined" or "in response to determining" or "once the [described condition or event] is detected" or "in response to detecting the [described condition or event]" depending on the context.

In addition, in the descriptions of the specification and claims of this application, the terms "first", "second", "third", and the like are merely intended for a purpose of differentiated description, but shall not be understood as an indication or an implication of relative importance.

Referring to "an embodiment" or "some embodiments" or the like in the specification of this application means that one or more embodiments of this application include a specific feature, structure, or characteristic described with reference to the embodiment. Thus, phrases "in one embodiment", "in some embodiments", "in some other embodiments", "in some additional embodiments", and the like that appear in different parts in this specification do not necessarily mean referring to a same embodiment, but mean "one or more embodiments, but not all embodiments", unless otherwise specifically emphasized. Terms "include", "comprise", "have", and their variants all mean "include but are not limited to", unless otherwise specifically emphasized.

A screenshot display method provided in embodiments of this application may be applied to a terminal device, for example, a mobile phone, a tablet computer, a wearable device, a vehicle-mounted device, an augmented reality (AR) device/a virtual reality (VR) device, a notebook computer, an ultra-mobile personal computer (UMPC), a netbook, or a personal digital assistant (PDA). A specific type of the terminal device is not limited in embodiments of this application.

For example, the terminal device is a mobile phone. FIG. 1 is a block diagram of a partial structure of a mobile phone according to an embodiment of this application. Refer to FIG. 1. The mobile phone includes components such as a radio frequency (RF) circuit 110, a memory 120, an input unit 130, a display unit 140, a sensor 150, an audio circuit 160, a wireless fidelity (Wi-Fi) module 170, a processor 180, and a power supply 190.

A person skilled in the art may understand that the structure of the mobile phone shown in FIG. 1 does not constitute any limitation on the mobile phone. The mobile phone may include more or fewer components than those shown in the diagram, or a combination of some components, or different component arrangements.

The following describes each component of the mobile phone in detail with reference to FIG. 1.

The RF circuit 110 may be configured to receive and send information, or receive and send a signal during a call. Particularly, the RF circuit 110 receives downlink information from a base station, and sends the downlink information to the processor 180 for processing; and sends uplink data to the base station. Generally, the RF circuit includes but is not limited to an antenna, at least one amplifier, a transceiver, a coupler, a low noise amplifier (LNA), a duplexer, and the like. In addition, the RF circuit 110 may further communicate with a network and another device through wireless communication. The wireless communication may use any communications standard or protocol, including but not limited to a global system for mobile communications (GSM), a general packet radio service (GPRS), code division multiple access (CDMA), wideband code division multiple access (WCDMA), long term evolution (LTE), an email, a short message service (SMS), and the like.

The memory 120 may be configured to store a software program and a module. By running the software program and the module that are stored in the memory 120, the processor 180 performs various function applications and data processing of the mobile phone. The memory 120 may mainly include a program storage area and a data storage area. The program storage area may store an operating system, an application program required by at least one function (such as a sound playing function and an image playing function), and the like, and the data storage area may store data (such as audio data and an address book) created based on use of the mobile phone, and the like. In addition, the memory 120 may include a high-speed random access memory, and may further include a non-volatile memory, for example, at least one magnetic disk storage component, a flash memory component, or another volatile solid-state storage component.

The input unit 130 may be configured to receive entered numeral or character information, and generate key signal input related to user setting and function control of the mobile phone. Specifically, the input unit 130 may include a touch panel 131 and another input device 132. The touch panel 131, also referred to as a touchscreen, may collect a touch operation performed by a user on or near the touch panel 131 (for example, an operation performed by the user on the touch panel 131 or near the touch panel 131 by using any suitable object or accessory such as a finger or a stylus), and drive a corresponding connection apparatus according to a preset program. Optionally, the touch panel 131 may include two parts:

a touch detection apparatus and a touch controller. The touch detection apparatus detects a touch orientation of the user, detects a signal brought by the touch operation, and sends the signal to the touch controller. The touch controller receives touch information from the touch detection apparatus, converts the touch information into touch point coordinates, sends the touch point coordinates to the processor 180, and can receive and execute a command sent by the processor 180. In addition, the touch panel 131 may be implemented into touch panels of a plurality of types, such as resistive, capacitive, infrared, and surface acoustic wave. In addition to the touch panel 131, the input unit 130 may include the other input device 132. Specifically, the other input device 132 may include but is not limited to one or more of a physical keyboard, a function key (such as a volume control key or an on/off key), a trackball, a mouse, a joystick, or the like.

The display unit 140 may be configured to display information entered by the user or information provided for the user, and various menus of the mobile phone. The display unit 140 may include a display panel 141. Optionally, the display panel 141 may be configured by using a liquid crystal display (LCD), an organic light-emitting diode (OLED), or the like. Further, the touch panel 131 may cover the display panel 141. After detecting a touch operation on or near the touch panel 131, the touch panel 131 transfers the touch operation to the processor 180 to determine a type of a touch event. Then the processor 180 provides corresponding visual output on the display panel 141 based on the type of the touch event. In FIG. 1, the touch panel 131 and the display panel 141 are used as two independent components to implement input and input functions of the mobile phone. However, in some embodiments, the touch panel 131 and the display panel 141 may be integrated to implement the input and output functions of the mobile phone.

In some embodiments, the display unit 140 may include one display or N displays, where N is a positive integer greater than 1.

In some embodiments, when the display panel is made of a material, for example, an OLED, an AMOLED, or an FLED, the display can be bent. Herein, the display being bent means that the display can be bent to any angle at any part along any axis, and may be maintained at the angle. For example, the display can be folded left and right from the middle. Alternatively, the display can be folded up and down from the middle. In this embodiment of this application, the display that can be bent may be referred to as a foldable screen. The foldable screen may be a screen, or may be a display formed by combining a plurality of screens. This is not limited herein. The display may alternatively be a flexible screen, has characteristics of strong flexibility and bendability, and can provide the user with a new interaction manner based on the bendable characteristic, to meet more requirements of the user for a mobile phone with a foldable screen. For the mobile phone with a foldable screen, the foldable screen of the mobile phone may be switched between a small screen in a folded form and a large screen in an unfolded form at any time.

For example, the foldable screen may include at least two physical forms: the unfolded form and the folded form. In the unfolded form, an included angle between the left and right ends of a middle bending part of the foldable screen (between the upper and lower ends of the middle bending part of the foldable screen if the foldable screen is folded up and down) that can be folded left and right from the middle ranges from a first angle and 180 degrees, where the first angle is greater than 0 degrees and less than 180 degrees. For example, the first angle may be 90 degrees. In the folded form, an included angle between the left and right ends of the middle bending part of the foldable screen (the upper and lower ends of the middle bending part of the foldable screen if the foldable screen is folded up and down) ranges from 0 degrees and the first angle. In this embodiment of this application, a display area of the foldable screen in the unfolded form may be divided into a first display and a second display. In the unfolded form, the display may be folded in a direction in which the first display and the second display face each other, or may be folded in a direction in which the first display and the second display are opposite to each other. In some embodiments, the included angle between the left and right ends of the middle bending part of the foldable screen (the upper and lower ends of the middle bending part of the foldable screen if the foldable screen is folded up and down) may range from 0 degrees and +180 degrees. For example, the foldable screen may be bent at an included angle of 30 degrees in a direction in which the first display and the second display face each other, or may be bent at an included angle of 30 degrees in a direction in which the first display and the second display are opposite to each other.

In some embodiments, the mobile phone may determine, through one or more of a gravity sensor, an acceleration sensor, and a gyroscope, whether the foldable screen is in the folded form or in the unfolded form. The mobile phone may further detect an included bending angle of the foldable screen through the gravity sensor, the acceleration touch sensor, and the gyroscope. Then, the mobile phone may determine, based on the included bending angle, whether the foldable screen is in the folded form or in the unfolded form. The mobile phone may further determine an orientation of the foldable screen in the folded form through one or more of the gravity sensor, the acceleration sensor, and the gyroscope, and further determine a display area of interface content output by a display system. For example, when the first display of the foldable screen faces upward relative to the ground, the mobile phone may display, on the first display, the interface content output by the display system. When the second display of the foldable screen faces upward relative to the ground, the mobile phone may display, on the second display, the interface content output by the display system.

In some embodiments, the mobile phone may further include an angle sensor (not shown in FIG. 1), and the angle sensor may be disposed at the bending part of the foldable screen. The mobile phone may measure, by using the angle sensor (not shown in FIG. 1) disposed at the bending part of the foldable screen, the included angle between two ends of the middle bending part of the foldable screen. When the included angle is greater than or equal to the first angle, the mobile phone may identify, by using the angle sensor, that the foldable screen enters the unfolded form. When the included angle is less than or equal to the first angle, the mobile phone may identify, by using the angle sensor, that the foldable screen enters the folded form.

In some other embodiments, the mobile phone may also identify, by using a physical switch disposed at the bending part of the foldable screen, whether the foldable screen is in the folded form. For example, when the mobile phone receives a folding operation performed by the user on the foldable screen, the physical switch disposed on the mobile phone is triggered to be turned on, and the mobile phone may determine that the foldable screen is in the folded form. When the mobile phone receives an unfolding operation performed by the user on the foldable screen, the physical switch disposed on the mobile phone is triggered to be turned off, and the mobile phone may determine that the foldable screen is in the unfolded form. The foregoing example is merely used to explain this application and shall not be construed as a limitation.

The mobile phone may further include at least one type of sensor 150, for example, a light sensor, a motion sensor, a resistance sensor, or another sensor. Specifically, the light sensor may include an ambient light sensor and a proximity sensor. The ambient light sensor may adjust luminance of the display panel 141 according to brightness of ambient light, and the proximity sensor may turn off the display panel 141 and/or backlight when the mobile phone approaches an ear of the user. As a type of motion sensor, an accelerometer sensor may detect a value of an acceleration in each direction (generally, three axes), may detect a value and a direction of gravity in a static state, and may be used in an application for identifying a mobile phone posture (such as screen switching between a landscape mode and a portrait mode, a related game, or magnetometer posture calibration), a function related to vibration identification (such as a pedometer or a knock), and the like. Other sensors such as a gyroscope, a barometer, a hygrometer, a thermometer, and an infrared sensor may be further disposed in the mobile phone. Details are not described herein.

The audio circuit 160, a loudspeaker 161, and a microphone 162 may provide an audio interface between the user and the mobile phone. The audio circuit 160 may transmit, to the loudspeaker 161, an electrical signal converted from received audio data, and the loudspeaker 161 converts the electrical signal into a sound signal for output. In addition, the microphone 162 converts a collected sound signal into an electrical signal, the audio circuit 160 converts the electrical signal into audio data upon receipt of the electrical signal and outputs the audio data to the processor 180 for processing, and then the audio data is sent to, for example, another mobile phone, by using the RF circuit 110, or the audio data is output to the memory 120 for further processing.

Wi-Fi belongs to a short-distance wireless transmission technology. The mobile phone may help, by using the Wi-Fi module 170, the user receive and send an email, browse a web page, access streaming media, and the like. The Wi-Fi module 170 provides wireless broadband Internet access for the user. Although the Wi-Fi module 170 is shown in FIG. 1, it should be understood that the Wi-Fi module 170 is not a mandatory component of the mobile phone, and may be omitted as required without changing a scope of the essence of the present invention.

The processor 180 is a control center of the mobile phone, and uses various interfaces and lines to connect all parts of the entire mobile phone. By running or executing the software program and/or the module that are/is stored in the memory 120 and invoking data stored in the memory 120, the processor 180 executes various functions and data processing of the mobile phone, to perform overall monitoring on the mobile phone. Optionally, the processor 180 may include one or more processing units. Preferably, the processor 180 may integrate an application processor and a modem processor. The application processor mainly processes an operating system, a user interface, an application program, and the like. The modem processor mainly processes wireless communication. It may be understood that the foregoing modem processor may be not integrated into the processor 180.

The mobile phone further includes the power supply 190 (such as a battery) that supplies power to each component. Preferably, the power supply may be logically connected to the processor 180 by using a power management system, to implement functions such as management of charging, discharging, and power consumption by using the power supply management system.

Although not shown, the mobile phone may further include a camera. Optionally, a position of the camera on the mobile phone 500 may be front-facing or rear-facing. This is not limited in this embodiment of this application.

Optionally, the mobile phone may include a single camera, dual-camera, triple-lens camera, or the like. This is not limited in this embodiment of this application.

For example, the mobile phone may include a triple-lens camera, where one is a primary camera, one is a wide-angle camera, and one is a long-focus camera.

Optionally, when the mobile phone includes a plurality of cameras, the plurality of cameras may be all front-facing, or all rear-facing, or some front-facing and some rear-facing. This is not limited in this embodiment of this application.

In addition, although not shown, the mobile phone may further include a Bluetooth module and the like. Details are not described herein.

Figure 2:
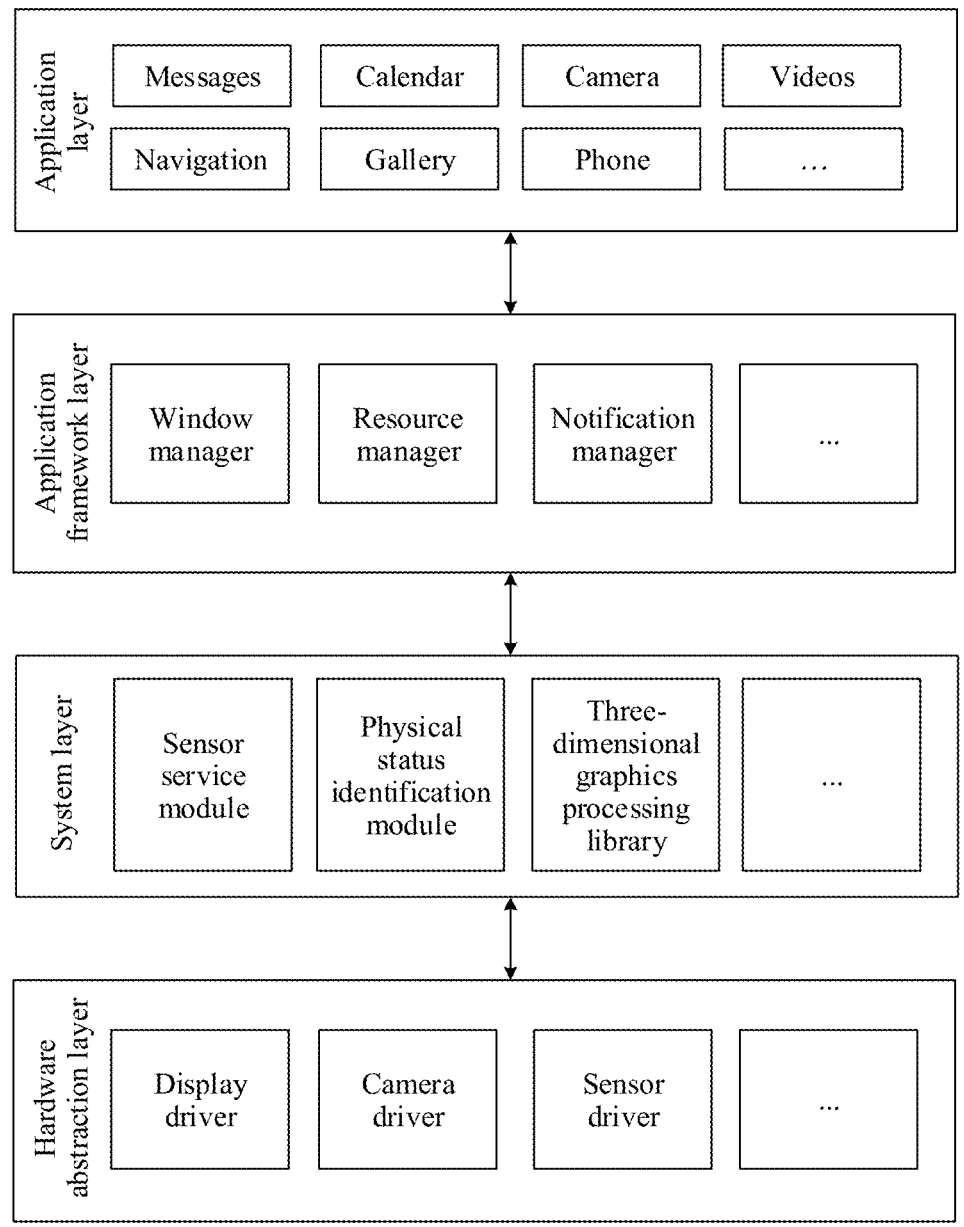
FIG. 2 is a schematic diagram of a software architecture of a mobile phone to which a screenshot display method is applicable according to an embodiment of this application.

FIG. 2 is a schematic diagram of a software structure of a mobile phone according to an embodiment of this application. For example, an operating system of the mobile phone is an Android system. In some embodiments, the Android system is divided into four layers: an application layer, an application framework layer (FWK), a system layer, and a hardware abstraction layer. The layers communicate with each other through a software interface.

As shown in FIG. 2, the application layer may include a series of application packages, and the application packages may include applications such as "messages", "calendar", "camera", "videos", "navigation", "gallery", and "phone".

The application framework layer provides an application programming interface (application programming interface, API) and a programming framework for an application at the application layer. The application framework layer may include some predefined functions, such as a function for receiving an event sent by the application framework layer.

As shown in FIG. 2, the application framework layer may include a window manager, a resource manager, a notification manager, and the like.

The window manager is configured to manage a window program. The window manager may obtain a size of a display, determine whether there is a status bar, perform screen locking, take a screenshot, and the like. The content provider is configured to: store and obtain data, and enable the data to be accessed by an application. The data may include a video, an image, audio, calls that are made and received, a browsing history, a browsing bookmark, an address book, and the like.

The resource manager provides various resources for an application such as a localized character string, an icon, a picture, a layout file, and a video file.

The notification manager enables an application to display notification information in a status bar, and may be configured to convey a notification message. The notification manager may automatically disappear after a short pause without requiring user interaction. For example, the notification manager is configured to provide notifications of download completing, a message prompt, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an alert sound is played, the electronic device vibrates, or the indicator light blinks.

The application framework layer may further include:

a view system, where the view system includes visual controls such as a control for displaying a text and a control for displaying an image. The view system may be configured to construct an application. A display interface may include one or more views. For example, a display interface including an SMS message notification icon may include a text display view and a picture display view.

The phone manager is configured to provide a communication function of the mobile phone, for example, management of a call status (including answering, declining, or the like).

The system layer may include a plurality of function modules, for example, a sensor service module, a physical status recognition module, and a three-dimensional graphics processing library (for example, OpenGL ES).

The sensor service module is configured to monitor sensor data uploaded by various types of sensors at a hardware layer, to determine a physical status of the mobile phone.

The physical status recognition module is configured to analyze and recognize a user gesture, a face, and the like.

The three-dimensional graphics processing library is configured to implement three-dimensional graphics drawing, image rendering, composition, layer processing, and the like.

The system layer may further include:

a surface manager, configured to manage a display subsystem and provide fusion of 2D and 3D layers for a plurality of applications; and a media library, which supports playback and recording of audio and video in a plurality of commonly used formats, static image files, and the like, and may support a plurality of audio and video coding formats, such as MPEG-4, H.264, MP3, AAC, AMR, JPG, and PNG.

The hardware abstraction layer is the layer between hardware and software. The hardware abstraction layer may include a display driver, a camera driver, an audio driver, a sensor driver, and the like, and is configured to drive related hardware at the hardware layer, such as a display, a camera, a speaker, and a sensor.

The following embodiments may be implemented on the mobile phone having the foregoing hardware structure/software structure. The following embodiments use a mobile phone as an example to describe the screenshot display method provided in embodiments of this application.

Specifically, the screenshot display method provided in embodiments of this application may be applied to a mobile phone with a foldable screen (which is referred to as a foldable mobile phone for short below). The foldable screen of the mobile phone may be an integrated flexible display, or a display including two rigid screens and a flexible screen located between the two rigid screens. The foldable screen may include a first display, a second display, and a bendable area connected to the first display and the second display. The foldable screen may be completely folded. In other words, an included angle between the first display and the second display is 0 degrees (the included angle may not reach 0 degrees, and depends on an actual angle reported by a sensor in the mobile phone). Alternatively, the foldable screen may be partially folded. In other words, the included angle between the first display and the second display is greater than 0 degrees and less than 180 degrees.

Figure 3:
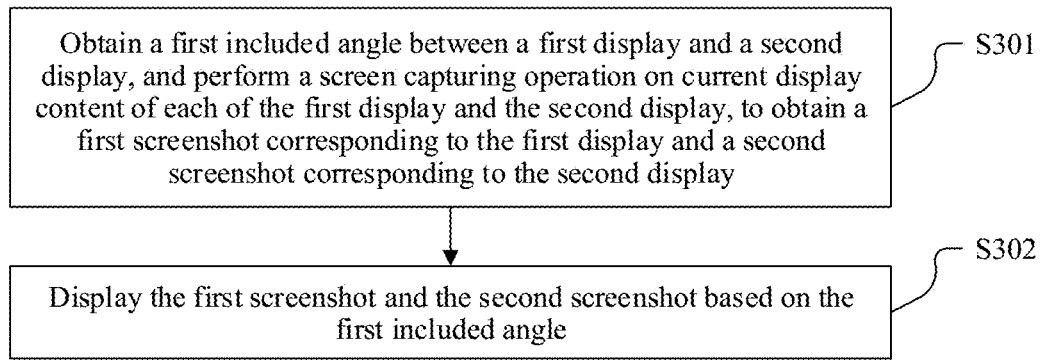
FIG. 3 is a schematic flowchart of a screenshot display method according to an embodiment of this application.

FIG. 3 is a schematic flowchart of the screenshot display method according to an embodiment of this application. As an example instead of a limitation, the screenshot display method may be applied to the foregoing foldable mobile phone. To be specific, when the foldable mobile phone takes a screenshot in a folded state, a first included angle between the first display and the second display may be recorded by using the sensor in the foldable mobile phone. When the screenshot is displayed, three-dimensional display of the screenshot may be implemented based on the first included angle, to fully reflect folding and bending characteristics of the foldable mobile phone, and improve a screenshot display effect of the foldable mobile phone. Specifically, as shown in FIG. 3, the screenshot display method may include the following steps.

S301: Obtain the first included angle between the first display and the second display, and perform a screen capturing operation on current display content of each of the first display and the second display, to obtain a first screenshot corresponding to the first display and a second screenshot corresponding to the second display.

It should be understood that this embodiment of this application is preferably applicable to screenshot display when the foldable mobile phone is in the folded state. That is, when the foldable mobile phone is unfolded to form a single-screen mobile phone, a screenshot display function of the foldable mobile phone may be the same as a screenshot display function of a conventional single-screen mobile phone. This is not limited in this embodiment of this application.

It should be noted that the screenshot display method provided in this embodiment of this application may alternatively be an optional screenshot display mode of the foldable mobile phone. That is, a three-dimensional display mode of a screenshot may be preset in the foldable mobile phone for selection by a user. During screenshot displaying, if the user selects the three-dimensional display mode, in a screen capturing process, the foldable mobile phone may obtain the first included angle between the first display and the second display. In addition, a screen capturing operation may be performed on the current display content of each of the first display and the second display to obtain the first screenshot corresponding to the first display and the second screenshot corresponding to the second display. When the screenshot is displayed, the foldable mobile phone may perform the three-dimensional display of the first screenshot and the second screenshot based on the first included angle. If the user does not select the three-dimensional display mode, the foldable mobile phone may directly take and display the screenshot of the content based on a conventional screenshot display mode.

Specifically, the foldable mobile phone may obtain the first included angle between the first display and the second display according to a detected screen capturing instruction. The screen capturing instruction may be an instruction for triggering generation of a preset button, an instruction for triggering generation of a preset gesture, an instruction for triggering generation of a preset voice keyword, or an instruction for starting a screen capturing function in screen capturing software. This is not limited in embodiments of this application. It should be understood that the screen capturing software may be system software with a screen capturing function on the mobile phone or third-party software with a screen capturing function installed on the mobile phone.

For example, in the foldable mobile phone, it may be preset that the screen capturing instruction is generated when a "volume+" button is triggered twice consecutively, or it may be preset that the screen capturing instruction is generated when a "power" button and a "home" button are triggered simultaneously. Therefore, when the user consecutively presses the "volume+" button twice, or when the user presses the "power" button and the "home" button simultaneously, the foldable mobile phone may generate and obtain the screen capturing instruction. For another example, in the foldable mobile phone, it may alternatively be preset that the screen capturing instruction is generated when a preset gesture, for example, a "C"-shaped gesture, is collected. Therefore, when the user enters a gesture matching the preset gesture, for example, the "C"-shaped gesture, the foldable mobile phone may generate and obtain the screen capturing instruction. For still another example, in the foldable mobile phone, it may alternatively be preset that the screen capturing instruction is generated when a preset voice keyword, for example, "take a screenshot" or "screen capture", is detected. Therefore, when a voice input by the user includes the preset voice keyword, for example, "take a screenshot" or "screen capture", the foldable mobile phone may generate and obtain the screen capturing instruction. For yet another example, when detecting that the user opens the screen capturing software and starts the screen capturing function in the screen capturing software, for example, when detecting that a screen capturing button in the screen capturing software is selected or tapped, the foldable mobile phone may generate and obtain the screen capturing instruction.

In a possible implementation, a resistance sensor may be disposed in the bendable area between the first display and the second display. For example, the resistance sensor may be disposed at a hinge of the bendable area, to obtain the first included angle between the first display and the second display by using a resistance change measured by the resistance sensor. Alternatively, an angle sensor may be disposed at the hinge of the bendable area, to measure the first included angle between the first display and the second display directly by using the angle sensor.

It should be noted that the first included angle between the first display and the second display may be calculated by using the resistance change measured by the resistance sensor in an existing calculation manner. This is not limited in embodiments of this application.

In another possible implementation, a gyroscope sensor may be disposed in each of the first display and the second display, so that the first included angle between the first display and the second display is measured and obtained by using the gyroscope sensors in the first display and the second display.

Figure 4:
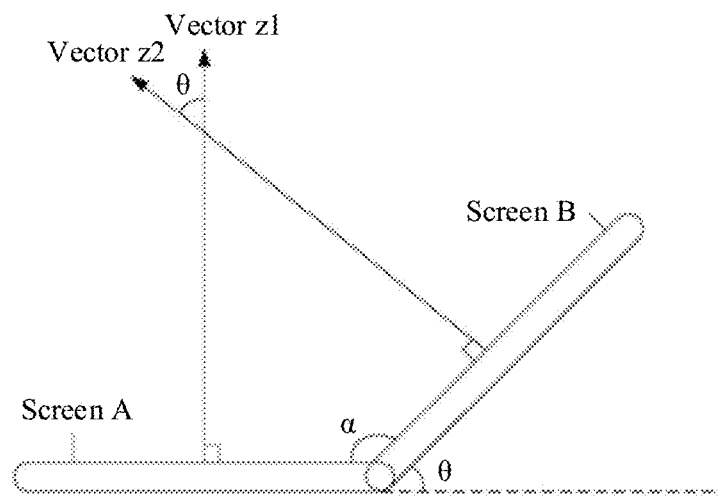
FIG. 4 is a schematic diagram of determining a first included angle in an application scenario according to a screenshot display method according to an embodiment of this application.

Specifically, as shown in FIG. 4, a gyroscope sensor A disposed in the first display (a screen A shown in FIG. 4) may obtain a direction vector z1 of an orientation of the first display, a gyroscope sensor B disposed in the second display (a screen B shown in FIG. 4) may obtain a direction vector z2 of an orientation of the second display, and an included angle θ between the direction vector z1 and the direction vector z2 may be calculated. For example, the included angle θ between the direction vector z1 and the direction vector z2 may be calculated according to a formula $\vec{z1} \cdot \vec{z2} = |\vec{z1}| \times |\vec{z2}| \times \cos\theta$, where $$\theta = \arccos\left(\frac{\vec{z1} \cdot \vec{z2}}{|\vec{z1}| \times |\vec{z2}|}\right).$$

As shown in FIG. 4, the direction vector z1 of the orientation of the first display is perpendicular to the first display, and the direction vector z2 of the orientation of the second display is perpendicular to the second display. Therefore, the first included angle α between the first display and the second display may be obtained based on the included angle θ between the direction vector z1 and the direction vector z2, where α=180°−θ. To be specific, the gyroscope sensor A is disposed in the first display and the gyroscope sensor B is disposed in the second display. In addition, the direction vector z1 of the orientation of the first display in a coordinate system of the gyroscope sensor A and the direction vector z2 of the orientation of the second display in a coordinate system of the gyroscope sensor B are obtained, so that the first included angle α between the first display and the second display may be determined.

It should be noted that a coordinate origin of the gyroscope sensor A in the first display does not coincide with a coordinate origin of the gyroscope sensor B in the second display. In other words, the direction vector z1 and the direction vector z2 are not in a same coordinate system. However, axes of the coordinate system in which the direction vector z1 is located are parallel to axes of the coordinate system in which the direction vector z2 is located. Therefore, the included angle θ between the direction vector z1 and the direction vector z2 may still be calculated according to the formula $\vec{z1} \cdot \vec{z2} = |\vec{z1}| \times |\vec{z2}| \times \cos\theta$, so that the first included angle α between the first display and the second display may be determined based on the included angle θ.

In this embodiment of this application, a gravity sensor may alternatively be disposed in each of the first display and the second display. To be specific, the first included angle between the first display and the second display may be measured by a gravity sensor A in the first display and a gravity sensor B in the second display.

It should be understood that, when the first included angle between the first display and the second display is obtained, the foldable mobile phone may further perform the screen capturing operation on the current display content of each of the first display and the second display, that is, perform screen capturing on each of the first display and the second display, to obtain the first screenshot corresponding to the first display and the second screenshot corresponding to the second display.

It should be noted that, performing the screen capturing operation on the current display content of the first display may be performing the screen capturing operation on all the current display content of the first display, that is, capturing the entire first display, or may be performing the screen capturing operation on a part of the current display content of the first display, that is, capturing a part of the first display. Similarly, performing the screen capturing operation on the current display content of the second display may be performing the screen capturing operation on all the current display content of the second display, or performing the screen capturing operation on a part of the current display content of the second display.

Figure 5A:
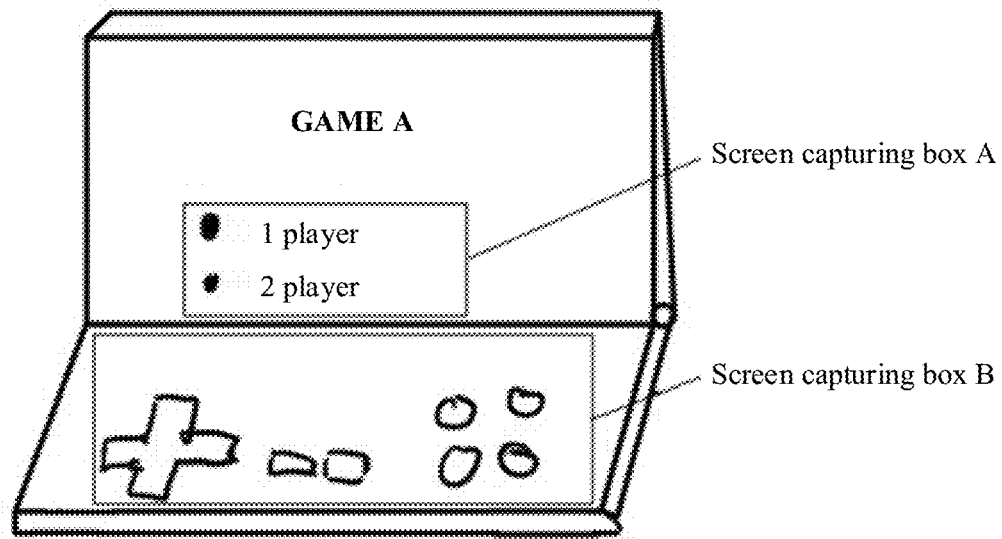
FIG. 5a to FIG. 5c are schematic screenshots in a specific application scenario according to a screenshot display method according to an embodiment of this application.

Specifically, a screen capturing area corresponding to the first display may be determined based on a screen capturing box corresponding to the first display. That is, whether the screen capturing operation is performed on the entire first display or a part of the first display may be determined based on the screen capturing box corresponding to the first display. A size and a location of the screen capturing box may be determined by the user. That is, the user can adjust the size and the location of the screen capturing box. For example, the screen capturing operation may be performed on a part of the first display based on a screen capturing box A corresponding to the first display shown in FIG. 5a. Similarly, a screen capturing area corresponding to the second display may be determined based on a screen capturing box corresponding to the second display. That is, whether the screen capturing operation is performed on the entire second display or a part of the second display may be determined based on the screen capturing box corresponding to the second display. For example, the screen capturing operation may be performed on the entire second display based on a screen capturing box B corresponding to the second display shown in FIG. 5a. Herein, in an actual operation, the screen capturing box B may select the entire second display. For clarity of illustration, in FIG. 5a, the screen capturing box B selects only an area having displayed content on the second display.

Figure 5B:
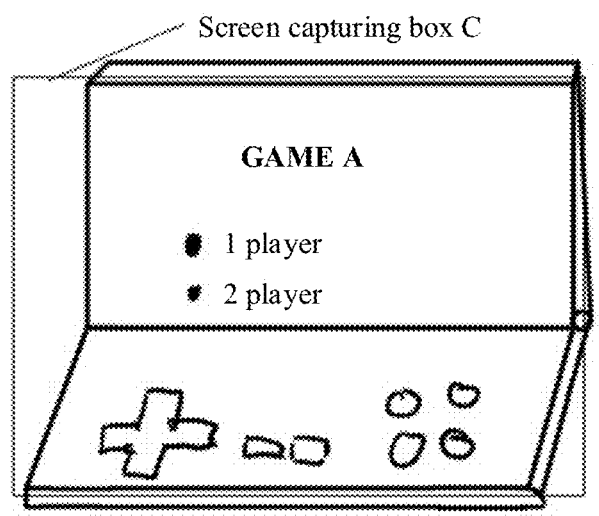
Figure 5C:
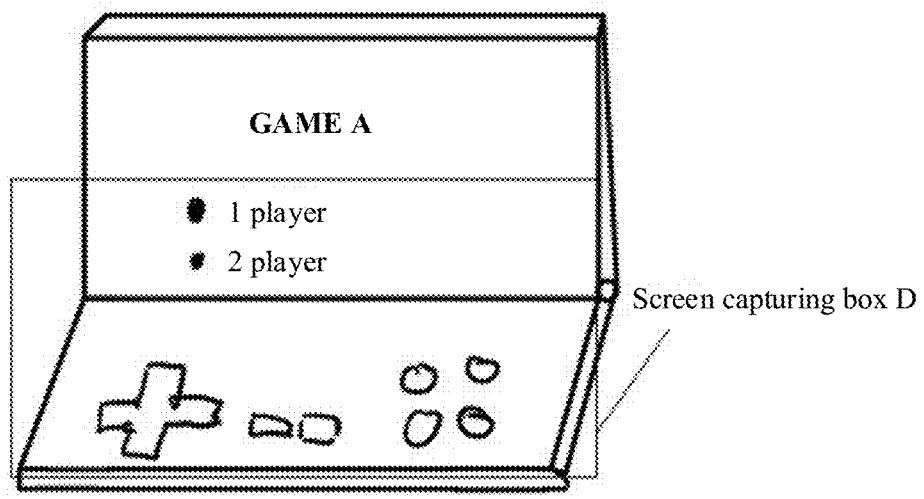

For example, alternatively, the screen capturing area corresponding to the first display and the screen capturing area corresponding to the second display may be separately determined based on a screen capturing box corresponding to the whole of the first display and the second display. That is, the screen capturing area corresponding to the first display and the screen capturing area corresponding to the second display may be determined based on areas that are selected by the screen capturing box in the first display and the second display. For example, the screen capturing operation may be performed on each of the entire first display and the entire second display based on a screen capturing box C shown in FIG. 5b. For another example, the screen capturing operation may be performed on a part of the first display and on the entire second display based on a screen capturing box D shown in FIG. 5c.

In embodiments of this application, the screen capturing areas corresponding to the first display and the second display may be determined in another existing manner. This is not limited in embodiments of this application.

It should be noted that after the screen capturing is completed, that is, after the foldable mobile phone obtains the first screenshot corresponding to the first display and the second screenshot corresponding to the second display, and obtains the first included angle between the first display and the second display, the screenshots and the first included angle may be correlatively stored. Specifically, during storage, the first screenshot may be associated with the first display, the second screenshot may be associated with the second display, the first screenshot may be associated with the second screenshot, and the first included angle may be associated with the first screenshot and/or the second screenshot, so that when three-dimensional display of the screenshot is performed, the to-be-displayed first screenshot and/or second screenshot may be first obtained. Then, the first display corresponding to the first screenshot, the second display corresponding to the second screenshot, and the first included angle between the first display and the second display may be obtained based on an association relationship. Therefore, three-dimensional display of the first screenshot and the second screenshot may be performed based on the first included angle, the first display, and the second display.

For example, the first screenshot, the second screenshot, and the first included angle may be stored in a same file, the association relationship between the first screenshot and/or the second screenshot and the first included angle is recorded, and the display associated with each of the first screenshot and the second screenshot is recorded.

For example, the first screenshot and the second screenshot may be correlatively stored in a file A that stores image information, and the first included angle may be stored in a file B that stores angle information. An association relationship between the image information in the file A and the angle information in the file B is recorded, and the display associated with each of the first screenshot and the second screenshot in the file A is recorded.

For example, the first screenshot may be stored in a file A that stores image information corresponding to the first display, the second screenshot may be stored in a file B that stores image information corresponding to the second display, and the first included angle may be stored in a file C that stores angle information. In addition, an association relationship between the image information in the file A, the image information in the file B, and the angle information in the file C is recorded.

Optionally, screenshot display in embodiments of this application may alternatively be continuous screenshot display, for example, may be screen recording display. In a screen recording process, the foldable mobile phone may perform consecutive screen capturing operations on the current display content of each of the first display and the current display content of the second display until a screen recording end instruction is received. For example, the foldable mobile phone may perform consecutive screen capturing operations on the current display content of each of the first display and the current display content of the second display based on a preset video frame rate. In addition, the foldable mobile phone may correspondingly obtain a first included angle between the first display and the second display based on each screenshot. That is, in the screen recording process, a frequency at which the first included angle is obtained needs to be the same as a frame rate of a recorded video. To be specific, in the screen recording process, a first timeline corresponding to the first included angle and a second timeline corresponding to the first screenshot and the second screenshot may be constructed, and the first timeline needs to be consistent with the second timeline.

For example, when 24 video frames are recorded in one second, a quantity of first included angles obtained in this second is also 24, so that each video frame (including the first screenshot corresponding to the first display and the second screenshot corresponding to the second display) has a corresponding first included angle. In addition, a first timeline at which the first included angle is obtained needs to be consistent with a second timeline at which the video frame is recorded. For example, when recording time of a first video frame is T1, obtaining time of a first included angle corresponding to the first video frame is also T1; when recording time of a second video frame is T2, obtaining time of a first included angle corresponding to the second video frame is also T2; . . . ; and when recording time of an $n^{th}$ video frame is Tn, obtaining time of a first included angle corresponding to the $n^{th}$ video frame is also Tn.

It should be noted that, in a continuous screenshot scenario, when correlatively storing the video frame and the first included angle, the foldable mobile phone may further correlatively store the timelines, that is, correlatively store the second timeline corresponding to the video frame and the first timeline corresponding to the first included angle. In this way, when displaying the recorded video frame, the foldable mobile phone may obtain each to-be-displayed video frame based on the second timeline of the video frame, and determine, based on the first timeline of the first included angle, the first included angle corresponding to each video frame. Therefore, three-dimensional display of each video frame may be performed based on the first included angle corresponding to each video frame, to fully reflect folding and bending characteristics of the foldable mobile phone, and improve a screen recording display effect of the foldable mobile phone.

S302: Display the first screenshot and the second screenshot based on the first included angle.

Specifically, the foldable mobile phone may display a screenshot according to a detected display instruction. The display instruction may be an instruction generated when the screenshot is tapped, may be an instruction for triggering generation of a preset button, may be an instruction for triggering generation of a preset gesture, or may be an instruction for triggering generation of a preset voice keyword. This is not limited in embodiments of this application.

It should be understood that, when receiving the display instruction for the screenshot, the foldable mobile phone may obtain the first screenshot, the second screenshot, and the first included angle associated with the first screenshot and the second screenshot, and display the first screenshot and the second screenshot on the display of the foldable mobile phone based on the first included angle.

For example, the first screenshot and the second screenshot may be displayed on the first display of the foldable mobile phone based on the first included angle. Alternatively, the first screenshot and the second screenshot may be displayed on the second display of the foldable mobile phone based on the first included angle.

For example, the first screenshot and the second screenshot may be displayed on the first display and the second display of the foldable mobile phone based on the first included angle. When the first screenshot and the second screenshot are displayed on the first display and the second display, the first display and the second display may be in an unfolded state, or may be in a folded state. This is not limited in embodiments of this application.

Figure 6A:
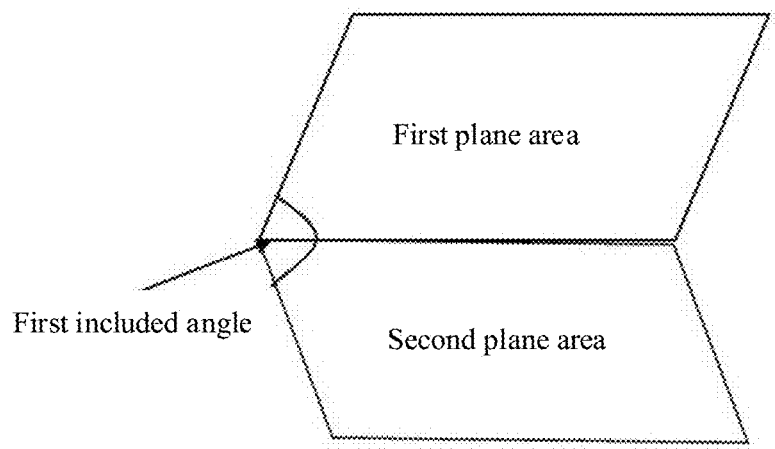
FIG. 6a is a schematic diagram of a plane area determined in an application scenario according to a screenshot display method according to an embodiment of this application.
Figure 6B:
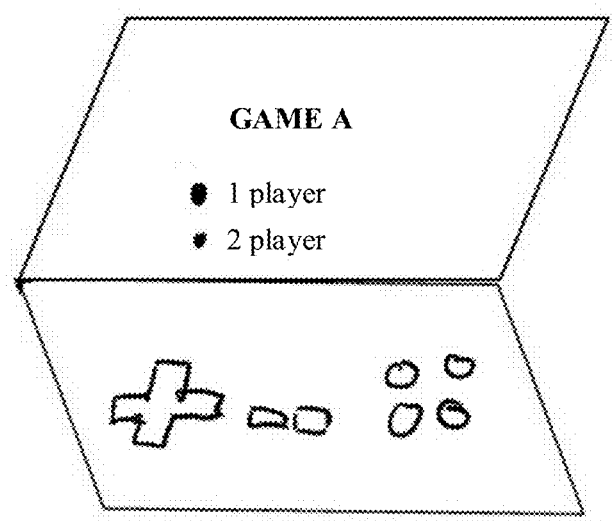
FIG. 6b is a schematic diagram of displaying a screenshot in a plane area determined in FIG. 6a according to a screenshot display method according to an embodiment of this application.

It should be noted that the foldable mobile phone may first determine, based on the first included angle, a first plane corresponding to the first screenshot and a second plane corresponding to the second screenshot, where a second included angle between the first plane and the second plane is the same as the first included angle. Then, the foldable mobile phone may determine a first plane area in the first plane and a second plane area in the second plane based on the first display and the second display respectively, that is, determine the first plane area in the first plane based on a first screen size of the first display and a preset scaling ratio, and determine the second plane area in the second plane based on a second screen size of the second display and the preset scaling ratio. The first plane area is connected to the second plane area. For example, the first plane area and the second plane area shown in FIG. 6a may be determined based on the first included angle, the first display, and the second display. Finally, the foldable mobile phone may determine a first display location of the first screenshot in the first display area based on first location information of the first screenshot in the first display, and display the first screenshot in the first display location. At the same time, the foldable mobile phone may also determine a second display location of the second screenshot in the second plane area based on second location information of the second screenshot in the second display, and display the second screenshot in the second display location. This implements the three-dimensional display of the screenshot. For example, in a specific application scenario, a three-dimensional display effect diagram shown in FIG. 6b may be obtained.

It should be understood that the first location information of the first screenshot in the first display may be determined, recorded and stored during screen capturing. Similarly, the second location information of the second screenshot in the second display may also be determined, recorded and stored during screen capturing. The first location information and the second location information may be determined in an existing location detection and/or determining manner. This is not limited in embodiments of this application.

In a possible implementation, a plurality of three-dimensional models corresponding to the foldable mobile phone may be constructed in advance based on a folding angle that the foldable screen of the foldable mobile phone may have, and a correspondence between each constructed three-dimensional model and the folding angle may be established. The folding angle of the foldable screen is the first included angle between the first display and the second display, and the constructed three-dimensional model may include a first display area corresponding to the first display and a second display area corresponding to the second display. A third included angle between the first display area and the second display area is the same as the folding angle corresponding to each three-dimensional model, that is, the first included angle between the first display and the second display corresponding to each three-dimensional model.

For example, a three-dimensional model A corresponding to the foldable mobile phone when the folding angle of the foldable screen is 10 degrees may be constructed. A three-dimensional model B corresponding to the foldable mobile phone when the folding angle of the foldable screen is 15 degrees may be constructed. A three-dimensional model C corresponding to the foldable mobile phone when the folding angle of the foldable screen is 80 degrees may be constructed. In addition, a correspondence in which the three-dimensional model A corresponds to 10 degrees, the three-dimensional model B corresponds to 15 degrees, and the three-dimensional model C corresponds to 80 degrees may be established.

It should be understood that the three-dimensional model corresponding to the foldable mobile phone may be constructed by the foldable mobile phone, or may be constructed by another terminal device. The constructed three-dimensional model may be stored in a memory of the foldable mobile phone, or may be stored in a cloud server or another terminal device connected to the foldable mobile phone.

Optionally, the foldable mobile phone or another terminal device may construct the three-dimensional model of the foldable mobile phone at different folding angles by using a 3D rendering engine (for example, Unity).

Specifically, the foldable mobile phone or the other terminal device may use a Mesh component in Unity to draw, based on appearances of the first display and the second display of the foldable mobile phone and the first included angle between the first display and the second display, a first mesh corresponding to the first display and a second mesh corresponding to the second display when the foldable mobile phone is in the folded state of the first included angle. An included angle between the first mesh and the second mesh is the first included angle. The whole formed by the first mesh and the second mesh may be the three-dimensional model of the foldable mobile phone at the first included angle. The first mesh may include the first display area, and the second mesh may include the second display area.

It should be noted that the foldable mobile phone or the other terminal device may alternatively construct a plurality of three-dimensional models of the foldable mobile phone at different folding angles by using another existing construction method corresponding to a 3D rendering engine. This is not limited in embodiments of this application.

It should be understood that, when constructing the plurality of three-dimensional models corresponding to the foldable mobile phone in advance, when displaying the first screenshot and the second screenshot based on the first included angle, the foldable mobile phone or the another terminal device may first obtain the three-dimensional model corresponding to the foldable mobile phone based on the first included angle, then render the first screenshot to the first display area of the three-dimensional model and the second screenshot to the second display area of the three-dimensional model, and finally implement the three-dimensional display of the screenshot by displaying the three-dimensional model.

Specifically, the first screenshot may be rendered to the first display area of the three-dimensional model and the second screenshot may be rendered to the second display area of the three-dimensional model by using an image rendering function of the 3D rendering engine (for example, Unity). This is not limited in embodiments of this application.

Figure 7A:
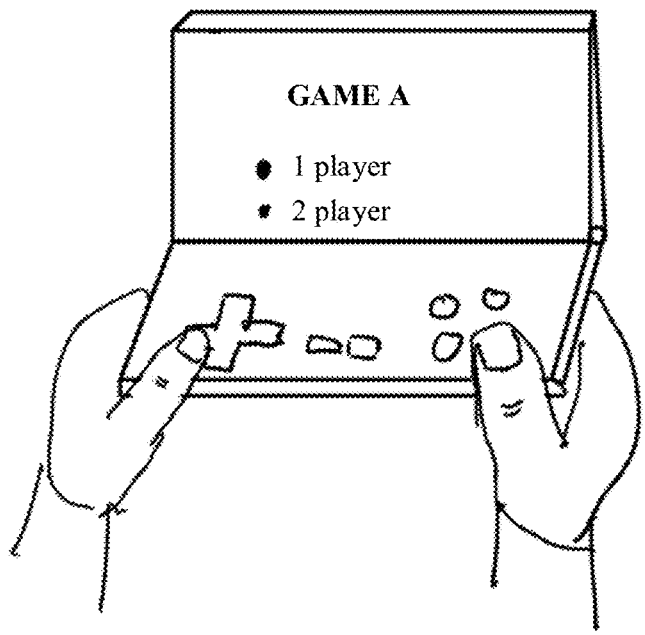
FIG. 7a is a schematic diagram of an application scenario according to an embodiment of this application.
Figure 7B:
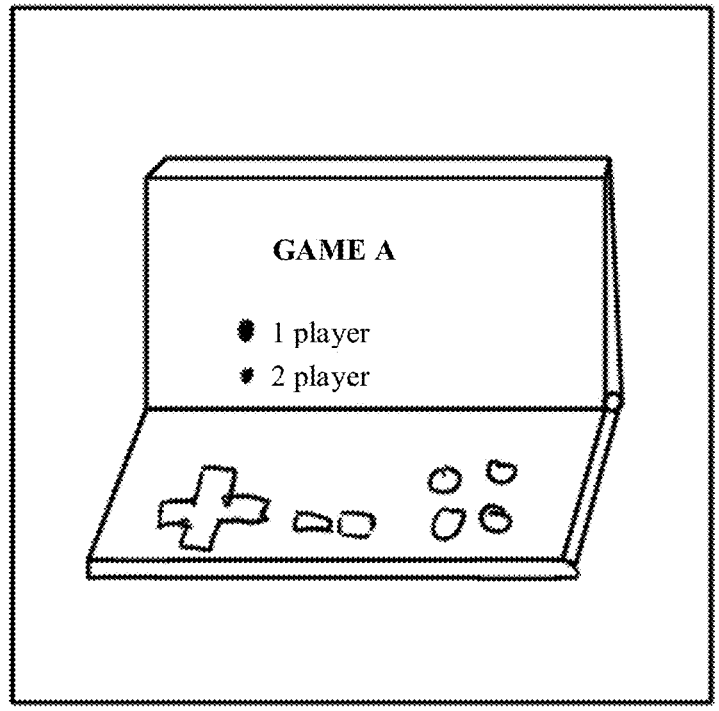
FIG. 7b is a schematic diagram of displaying a screenshot of an application scenario shown in FIG. 7a according to an embodiment of this application.

For example, when the foldable mobile phone is in a folded state shown in FIG. 7a, when a screen capturing operation is performed on all the current display content of the first display and the second display of the foldable mobile phone, the foldable mobile phone may first obtain the first included angle between the first display and the second display in the folded state. Subsequently, the foldable mobile phone may obtain, based on the first included angle, the three-dimensional model corresponding to the first included angle from the memory of the foldable mobile phone, the cloud server, or the other another terminal device. Then, the foldable mobile phone may render the first screenshot captured from the first display to the first display area of the obtained three-dimensional model and the second screenshot captured from the second display to the second display area of the obtained three-dimensional model, and obtain a display effect diagram shown in FIG. 7b by displaying the three-dimensional model.

In a possible implementation, the foldable mobile phone may also alternatively store the first screenshot and the second screenshot in a three-dimensional mode. That is, in a screen capturing process, when it is determined that the three-dimensional display of the screenshot is performed, after obtaining the first screenshot corresponding to the first display, the second screenshot corresponding to the second display, and the first included angle between the first display and the second display, the foldable mobile phone may directly obtain, based on the first included angle, the three-dimensional model corresponding to the first included angle from the previously constructed three-dimensional models, then render the first screenshot to the first display area of the obtained three-dimensional model and the second screenshot to the second display area of the obtained three-dimensional model, and then store the three-dimensional model in the memory of the foldable mobile phone, the cloud server, or the other terminal device. Therefore, when receiving a display instruction for the screenshot, the foldable mobile phone or the other terminal device may directly obtain a three-dimensional model corresponding to the screenshot from the memory of the foldable mobile phone, the cloud server, or the other terminal device in a wired or wireless manner, and then display the three-dimensional model on the display of the foldable mobile phone, to improve a display speed of three-dimensional display of the screenshot by obtaining the three-dimensional model and rendering the screenshot in advance. This improves user experience.

Optionally, when the three-dimensional model is displayed, a display angle corresponding to the three-dimensional model may be first determined, and the three-dimensional model may be displayed based on the display angle.

For example, an angle directly facing the first display may be determined as the display angle, or an angle directly facing the second display may be determined as the display angle, or an angle directly facing the bendable area between the first display and the second display may be determined as the display angle.

In a possible implementation, the display angle corresponding to the three-dimensional model may be determined based on a preset correspondence between the three-dimensional model and the display angle, where the preset correspondence may be established when the three-dimensional model is constructed. For example, when the three-dimensional model is constructed, the preset correspondence may be established based on a correspondence set by the user. For another example, when the three-dimensional model is constructed, the preset correspondence may be established based on a current display angle of an image in the foldable mobile phone.

In another possible implementation, the display angle corresponding to the three-dimensional model may be further determined based on a display carrier (namely, a terminal device, for example, a foldable mobile phone) on which the three-dimensional model is currently displayed. That is, each terminal device, for example, a foldable mobile phone, may have a display angle for displaying a folded image. The display angle may be customized by the user, or may be defaulted by a system of the terminal device, for example, the foldable mobile phone.

For example, in a screenshot displaying process, the user may also adjust a field of view of viewing the screenshot by swiping the display in various directions, where both the upper and lower sides have 360-degree rotatable fields of view.

In another possible implementation, the foldable mobile phone or the other terminal device may construct, in real time, the three-dimensional model corresponding to the foldable mobile phone. That is, in a screenshot displaying process, the foldable mobile phone or the other terminal device may construct the three-dimensional model currently corresponding to the foldable mobile phone in real time. To be specific, the foldable mobile phone or the other terminal device may construct the three-dimensional model of the foldable mobile phone in the folded state in real time when the foldable mobile phone performs a screen capturing operation, to reduce a storage memory of the foldable mobile phone or the other terminal device, reduce resource occupation, and improve screen capturing operation efficiency of the foldable mobile phone.

Specifically, the foldable mobile phone or another terminal device may first obtain attribute information corresponding to the foldable mobile phone, where the attribute information may include information such as appearances of the first display and the second display of the foldable mobile phone. Then, the foldable mobile phone or the other terminal device may draw the three-dimensional model corresponding to the foldable mobile phone based on the attribute information and the first included angle, where the drawn three-dimensional model may include the first display area corresponding to the first display and the second display area corresponding to the second display. In addition, a fourth included angle between the first display area and the second display area is the same as a corresponding folding angle when the foldable mobile phone performs a screen capturing operation. That is, the fourth included angle is the same as the first included angle between the first display and the second display of the foldable mobile phone when the screen capturing operation is performed. Finally, the foldable mobile phone or the other terminal device may render the first screenshot to the first display area of the three-dimensional model and the second screenshot to the second display area of the three-dimensional model, and implement three-dimensional display of the screenshot by displaying the three-dimensional model.

Optionally, the foldable mobile phone or the other terminal device may construct, in real time by using a 3D rendering engine (for example, Unity), the three-dimensional model currently corresponding to the foldable mobile phone.

Specifically, the foldable mobile phone or the another terminal device may first use a Mesh component in Unity to draw, based on the attribute information (for example, the appearances of the first display and the second display in the attribute information) corresponding to the foldable mobile phone and the corresponding folding angle when the foldable mobile phone performs the screen capturing operation, a first mesh corresponding to the first display and a second mesh corresponding to the second display when the foldable mobile phone is at the folding angle. An included angle between the first mesh and the second mesh is the same as the corresponding folding angle when the foldable mobile phone performs the screen capturing operation. The first mesh may include the first display area, and the second mesh may include the second display area. Then, the first screenshot may be rendered to the first display area of the three-dimensional model and the second screenshot may be rendered to the second display area of the three-dimensional model by using an image rendering function in Unity. In addition, the three-dimensional display of the screenshot may be performed by displaying a rendered three-dimensional model.

Optionally, when the three-dimensional model is displayed, a display angle corresponding to the three-dimensional model may be first determined, and the three-dimensional model may be displayed based on the display angle. The display angle is defined and determined in the same manner as the foregoing display angle. For brevity, details are not described herein again.

In a possible implementation, the foldable mobile phone may display a screenshot based on a current folded state of the foldable mobile phone. Specifically, when the current folded state of the foldable mobile phone is the same as a folded state when the screen capturing operation is performed, the first screenshot may be directly displayed on the first display of the foldable mobile phone, and the second screenshot may be directly displayed on the second display of the foldable mobile phone. That is, three-dimensional display of the screenshot may be implemented directly based on the foldable mobile phone, instead of constructing or obtaining the three-dimensional model. However, when the current folded state of the foldable mobile phone is different from the folded state when the screen capturing operation is performed, an adjustment instruction may be output to instruct the user to adjust the folded state of the foldable mobile phone, or the three-dimensional model is constructed or obtained, and then the three-dimensional display of the screenshot is performed based on the three-dimensional model.

For example, when displaying the screenshot, the foldable mobile phone may first obtain a fifth included angle between the first display and the second display in the current folded state, and may determine whether the fifth included angle is the same as the first included angle corresponding to the screenshot. If the fifth included angle is the same as the first included angle corresponding to the screenshot, the first screenshot may be directly displayed on the first display, and the second screenshot may be directly displayed on the second display. If the fifth included angle is different from the first included angle corresponding to the screenshot, an adjustment instruction may be output based on the first included angle corresponding to the screenshot and the fifth included angle, to instruct the user to adjust the first display and/or the second display. For example, an adjustment instruction for adjusting a preset angle of the first display of the foldable mobile phone in a clockwise direction or in a counterclockwise direction may be output based on the fifth included angle and the first included angle, to instruct the user to adjust the first display.

It should be understood that after the user completes adjustment of the folded state, the foldable mobile phone may continue to obtain an adjusted fifth included angle between the first display and the second display. If the adjusted fifth included angle is the same as the first included angle corresponding to the screenshot, the first screenshot may be directly displayed on the first display, and the second screenshot may be directly displayed on the second display. If the adjusted fifth included angle is different from the first included angle corresponding to the screenshot, an adjustment instruction may continue to be output based on the first included angle corresponding to the screenshot and the adjusted fifth included angle, to instruct the user to adjust the first display and/or the second display until the adjusted fifth included angle is the same as the first included angle corresponding to the screenshot. Alternatively, if the adjusted fifth included angle is different from the first included angle corresponding to the screenshot, a three-dimensional model corresponding to the foldable mobile phone in the folded state corresponding to the first included angle may be first obtained or constructed. Then, in the current folded state in which the foldable mobile phone displays the screenshot, the three-dimensional display of the screenshot may be implemented by using the three-dimensional model. That is, the first screenshot and the second screenshot may be first rendered to the first display area and the second display area of the three-dimensional model, and then the three-dimensional model may be folded and displayed based on the current folded state of the foldable mobile phone.

It should be noted that although the foregoing describes only screenshot display when the foldable mobile phone has two displays, embodiment of this application sets no limitation on a quantity of displays of the foldable mobile phone. That is, embodiments of this application may not only be applied to screenshot display when the foldable mobile phone has two displays, but certainly may also be applied to screenshot display when the foldable mobile phone has three or more displays. A principle of the screenshot display when the foldable mobile phone has three or more displays is the same as a principle of the screenshot display when the foldable mobile phone has two displays. That is, a first included angle between any two connected displays is first obtained, and a screenshot corresponding to current display content in each display is captured. Then, each screenshot may be displayed based on each included angle. For example, a three-dimensional model when the foldable mobile phone performs a screen capturing operation may be obtained or constructed based on each included angle. The three-dimensional model may include three or more display areas, and each screenshot may be rendered to a display area corresponding to the screenshot in the three-dimensional model. Then, three-dimensional display of the screenshot may be implemented by displaying the three-dimensional model.

In embodiments of this application, when a screen capturing instruction is received, the first included angle between the first display and the second display may be first obtained, and the screen capturing operation may be performed on the current display content of each of the first display and the second display, to obtain the first screenshot corresponding to the first display and the second screenshot corresponding to the second display. Then, the first screenshot and the second screenshot may be displayed based on the first included angle. That is, in embodiments of this application, during screen capturing, the first included angle between the first display and the second display may be obtained, so that when the screenshot is displayed, the three-dimensional display of the first screenshot and the second screenshot may be performed based on the first included angle, to fully reflect folding and bending characteristics of the terminal device having a foldable screen, implement the three-dimensional display of the screenshot, and improve a display effect of the screenshot.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application.

Figure 8:
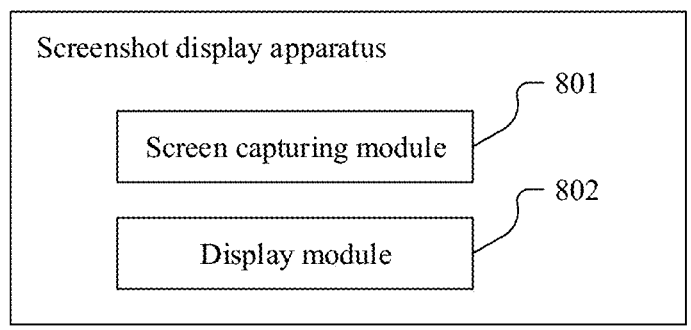
FIG. 8 is a schematic diagram of a structure of a screenshot display apparatus according to an embodiment of this application.

Corresponding to the screenshot display method in the foregoing embodiment, FIG. 8 is a block diagram of a structure of a screenshot display apparatus according to an embodiment of this application. For ease of description, only a part related to embodiments of this application is shown.

Refer to FIG. 8. The screenshot display apparatus is applied to a terminal device having a foldable screen, where the foldable screen includes a first display and a second display. The screenshot display apparatus may include:

a screen capturing module 801, configured to obtain a first included angle between the first display and the second display, and perform a screen capturing operation on current display content of each of the first display and the second display, to obtain a first screenshot corresponding to the first display and a second screenshot corresponding to the second display; and a display module 802, configured to display the first screenshot and the second screenshot based on the first included angle.

In a possible implementation, the display module 802 may include:

a plane determining unit, configured to determine, based on the first included angle, a first plane corresponding to the first screenshot and a second plane corresponding to the second screenshot, where a second included angle between the first plane and the second plane is the same as the first included angle;

an area determining unit, configured to separately determine a first plane area in the first plane and a second plane area in the second plane based on the first display and the second display; and a first display unit, configured to display the first screenshot in the first plane area, and display the second screenshot in the second plane area.

Optionally, the first display unit may include:

a first location determining subunit, configured to determine a first display location of the first screenshot in the first display area based on first location information of the first screenshot in the first display;

a second location determining subunit, configured to determine a second display location of the second screenshot in the second plane area based on second location information of the second screenshot in the second display; and a first display subunit, configured to display the first screenshot in the first display location, and display the second screenshot in the second display location.

In a possible implementation, the display module 802 may include:

a model obtaining unit, configured to obtain, based on the first included angle, a three-dimensional model corresponding to the terminal device, where the three-dimensional model includes a first display area corresponding to the first display and a second display area corresponding to the second display, and a third included angle between the first display area and the second display area is the same as the first included angle;

a first image rendering unit, configured to render the first screenshot to the first display area of the three-dimensional model, and render the second screenshot to the second display area of the three-dimensional model; and a second display unit, configured to display the three-dimensional model.

For example, the second display unit is specifically configured to determine a display angle corresponding to the three-dimensional model, and display the three-dimensional model based on the display angle.

In another possible implementation, the display module 802 may further include:

an attribute information obtaining unit, configured to obtain attribute information corresponding to the terminal device;

a model construction unit, configured to draw, based on the attribute information and the first included angle, a three-dimensional model corresponding to the terminal device, where the three-dimensional model includes a first display area corresponding to the first display and a second display area corresponding to the second display, and a fourth included angle between the first display area and the second display area is the same as the first included angle;

a second image rendering unit, configured to render the first screenshot to the first display area of the three-dimensional model, and render the second screenshot to the second display area of the three-dimensional model; and a third display unit, configured to display the three-dimensional model.

In a possible implementation, the display module 802 may further include:

a first included angle obtaining unit, configured to obtain a fifth included angle between the first display and the second display;

a fourth display unit, configured to: if the fifth included angle is the same as the first included angle, display the first screenshot in the first display, and display the second screenshot in the second display; and an instruction output unit, configured to: if the fifth included angle is different from the first included angle, output an adjustment instruction based on the first included angle and the fifth included angle, to instruct a user to adjust the first display and/or the second display.

In another possible implementation, the display module 802 may further include:

a second included angle obtaining unit, configured to obtain a fifth included angle between the first display and the second display;

a fifth display unit, configured to: if the fifth included angle is the same as the first included angle, display the first screenshot in the first display, and display the second screenshot in the second display; and a sixth display unit, configured to: if the fifth included angle is different from the first included angle, display the first screenshot and the second screenshot based on the first included angle.

Optionally, the screenshot display apparatus may further include:

a timeline construction module, configured to construct a first timeline corresponding to the first included angle and a second timeline corresponding to the first screenshot and the second screenshot, where the first timeline corresponds to the second timeline.

Correspondingly, the display module 802 may further include:

a third included angle obtaining unit, configured to obtain the first screenshot and the second screenshot based on the second timeline, and obtain, based on the first timeline, the first included angle corresponding to the first screenshot and the second screenshot; and a seventh display unit, configured to display the first screenshot and the second screenshot based on the first included angle.

It should be noted that content such as information exchange and an execution process between the foregoing apparatuses/units is based on a same concept as that in the method embodiments of this application. For specific functions and technical effects of the content, refer to the method embodiments. Details are not described herein again.

It may be clearly understood by a person skilled in the art that, for the purpose of convenient and brief description, division of the foregoing function units and modules is used as an example for illustration. In an actual application, the foregoing functions can be allocated to different function units and modules and implemented based on a requirement, that is, an inner structure of the apparatus is divided into different function units and modules to implement all or some of the functions described above. Functional units and modules in embodiments may be integrated into one processing unit, or each of the units may exist alone physically, or two or more units may be integrated into one unit. The integrated unit may be implemented in a form of hardware, or may be implemented in a form of a software functional unit. In addition, specific names of the functional units and modules are merely used to distinguish each other, and are not intended to limit the protection scope of this application.

For a specific working process of the units and modules in the foregoing system, refer to a corresponding process in the foregoing method embodiments. Details are not described herein again.

Figure 9:
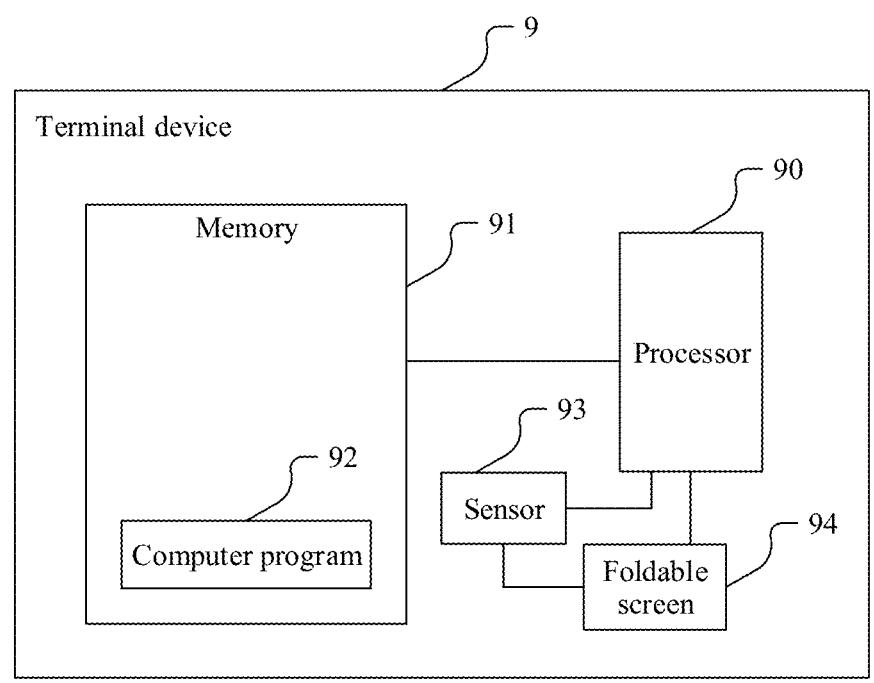
FIG. 9 is a schematic diagram of a structure of a terminal device according to an embodiment of this application.

FIG. 9 is a schematic diagram of a structure of a terminal device according to an embodiment of this application. As shown in FIG. 9, a terminal device 9 in this embodiment includes: at least one sensor 93 (only one is shown in FIG. 9), a foldable screen 94, at least one processor 90 (only one is shown in FIG. 9), a memory 91, and a computer program 92 that is stored in the memory 91 and that can be run on the at least one processor 90. When executing the computer program 92, the processor 90 implements the steps in any of the foregoing screenshot display method embodiments.

The terminal device 9 may include, but is not limited to, the processor 90 and the memory 91. Persons skilled in the art may understand that FIG. 9 is merely an example of the terminal device 9, and does not constitute a limitation on the terminal device 9. The terminal device may include more or fewer components than those shown in the figure, or some components may be combined, or different components may be used. For example, the terminal device may further include an input/output device, a network access device, or the like.

The processor 90 may be a central processing unit (CPU), or may be another general-purpose processor, a digital signal processor (DSP), an application-specific integrated circuit (ASIC), a field-programmable gate array (FPGA), or another programmable logic device, a discrete gate, a transistor logic device, a discrete hardware component, or the like. The general-purpose processor may be a microprocessor, or the processor may be any conventional processor, or the like.

In some embodiments, the memory 91 may be an internal storage unit of the terminal device 9, for example, a hard disk or memory of the terminal device 9. In some other embodiments, the memory 91 may alternatively be an external storage device of the terminal device 9, for example, a removable hard disk, a smart media card (SMC), a secure digital (SD) card, a flash memory card (Flash Card), or the like that is equipped with the terminal device 9. Further, the memory 91 may alternatively include both an internal storage unit and an external storage device of the terminal device 9. The memory 91 is configured to store an operating system, an application, a boot loader, data, and another program, for example, program code of the computer program. The memory 91 may further be configured to temporarily store data that has been output or is to be output.

An embodiment of this application further provides a computer-readable storage medium. The computer-readable storage medium stores a computer program. When the computer program is executed by a processor, the steps in the foregoing screenshot display method embodiments can be implemented.

An embodiment of this application further provides a computer program product. When the computer program product runs on a terminal device, the terminal device can implement the steps in the foregoing screenshot display method embodiments.

When the integrated unit is implemented in the form of a software functional unit and sold or used as an independent product, the integrated unit may be stored in a computer-readable storage medium. Based on such an understanding, in this application, all or some of the procedures of the methods in the foregoing embodiments may be implemented by a computer program instructing related hardware. The computer program may be stored in a computer-readable storage medium. When the computer program is executed by a processor, the steps in the foregoing method embodiments can be implemented. The computer program includes computer program code, and the computer program code may be in a source code form, an object code form, an executable file form, some intermediate forms, or the like. The computer-readable medium may include at least any entity or apparatus that can carry computer program code to a photographing apparatus/terminal device, a recording medium, a computer memory, a read-only memory (ROM), a random access memory (RAM), an electrical carrier signal, a telecommunications signal, and a software distribution medium, for example, a USB flash drive, a removable hard disk, a magnetic disk, or an optical disk. In some jurisdictions, according to legislation and patent practice, a computer-readable medium cannot be an electrical carrier signal or a telecommunication signal.

In the foregoing embodiments, the description of each embodiment has respective focuses. For a part that is not described in detail or recorded in an embodiment, refer to related descriptions in other embodiments.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In embodiments provided in this application, it should be understood that the disclosed apparatus/network device and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A screenshot display method, applied to a terminal device having a foldable screen, wherein the foldable screen comprises a first display and a second display, and the screenshot display method comprises:

obtaining a first included angle between the first display and the second display, and performing a screen capturing operation on currently displayed content of each of the first display and the second display, to obtain a first screenshot corresponding to the first display and a second screenshot corresponding to the second display; and displaying the first screenshot on the first display and the second screenshot on the second display based on the first included angle by obtaining, based on the first included angle, a three-dimensional model corresponding to the terminal device, wherein the three-dimensional model comprises a first display area corresponding to the first display and a second display area corresponding to the second display, and a second included angle between the first display area and the second display area is the same as the first included angle, rendering the first screenshot to the first display area of the three-dimensional model, and rendering the second screenshot to the second display area of the three-dimensional model, and displaying the three-dimensional model.

2. The screenshot display method according to claim 1, wherein displaying the first screenshot and the second screenshot based on the first included angle comprises:

determining, based on the first included angle, a first plane corresponding to the first screenshot and a second plane corresponding to the second screenshot, wherein a second included angle between the first plane and the second plane is the same as the first included angle;

separately determining a first plane area in the first plane and a second plane area in the second plane based on the first display and the second display; and displaying the first screenshot in the first plane area, and displaying the second screenshot in the second plane area.

3. The screenshot display method according to claim 2, wherein displaying the first screenshot in the first plane area, and displaying the second screenshot in the second plane area comprises:

determining a first display location of the first screenshot in the first display area based on first location information of the first screenshot in the first display;

determining a second display location of the second screenshot in the second plane area based on second location information of the second screenshot in the second display; and displaying the first screenshot in the first display location, and displaying the second screenshot in the second display location.

4. The screenshot display method according to claim 1, wherein displaying the three-dimensional model comprises:

determining a display angle corresponding to the three-dimensional model, and displaying the three-dimensional model based on the display angle.

5. The screenshot display method according to claim 1, wherein displaying the first screenshot and the second screenshot based on the first included angle comprises:

obtaining attribute information corresponding to the terminal device; and drawing, based on the attribute information and the first included angle, the three-dimensional model corresponding to the terminal device.

6. The screenshot display method according to claim 1, wherein displaying the first screenshot and the second screenshot based on the first included angle comprises:

obtaining a second included angle between the first display and the second display; and if the second included angle is the same as the first included angle, displaying the first screenshot in the first display, and displaying the second screenshot in the second display; or if the second included angle is different from the first included angle, outputting an adjustment instruction based on the first included angle and the second included angle, to instruct a user to adjust the first display or the second display.

7. The screenshot display method according to claim 1, wherein the screenshot display method further comprises:

constructing a first timeline corresponding to the first included angle and a second timeline corresponding to the first screenshot and the second screenshot, wherein the first timeline corresponds to the second timeline; and displaying the first screenshot and the second screenshot based on the first included angle comprises:

obtaining the first screenshot and the second screenshot based on the second timeline, and obtaining, based on the first timeline, the first included angle corresponding to the first screenshot and the second screenshot.

8. A terminal device, comprising a foldable screen, a sensor, a memory, a processor, and a computer program that is stored in the memory and that can be run on the processor, wherein when executing the computer program, the terminal device performs:

obtaining a first included angle between the first display and the second display, and performing a screen capturing operation on currently displayed content of each of the first display and the second display, to obtain a first screenshot corresponding to the first display and a second screenshot corresponding to the second display; and displaying the first screenshot on the first display and the second screenshot on the second display based on the first included angle by obtaining, based on the first included angle, a three-dimensional model corresponding to the terminal device, wherein the three-dimensional model comprises a first display area corresponding to the first display and a second display area corresponding to the second display, and a second included angle between the first display area and the second display area is the same as the first included angle, rendering the first screenshot to the first display area of the three-dimensional model, and rendering the second screenshot to the second display area of the three-dimensional model, and displaying the three-dimensional model.

9. The device according to claim 8, wherein displaying the first screenshot and the second screenshot based on the first included angle comprises:

determining, based on the first included angle, a first plane corresponding to the first screenshot and a second plane corresponding to the second screenshot, wherein a second included angle between the first plane and the second plane is the same as the first included angle;

separately determining a first plane area in the first plane and a second plane area in the second plane based on the first display and the second display; and displaying the first screenshot in the first plane area, and displaying the second screenshot in the second plane area.

10. The device according to claim 9, wherein displaying the first screenshot in the first plane area, and displaying the second screenshot in the second plane area comprises:
   determining a first display location of the first screenshot in the first display area based on first location information of the first screenshot in the first display;
   determining a second display location of the second screenshot in the second plane area based on second location information of the second screenshot in the second display; and
   displaying the first screenshot in the first display location, and displaying the second screenshot in the second display location.

11. The device according to claim 8, wherein displaying the three-dimensional model comprises:
   determining a display angle corresponding to the three-dimensional model, and displaying the three-dimensional model based on the display angle.

12. The device according to claim 8, wherein displaying the first screenshot and the second screenshot based on the first included angle comprises:
   obtaining attribute information corresponding to the terminal device; and
   drawing, based on the attribute information and the first included angle, the three-dimensional model corresponding to the terminal device.

13. The device according to claim 8, wherein displaying the first screenshot and the second screenshot based on the first included angle comprises:
   obtaining a second included angle between the first display and the second display; and
   if the second included angle is the same as the first included angle, displaying the first screenshot in the first display, and displaying the second screenshot in the second display; or
   if the second included angle is different from the first included angle, outputting an adjustment instruction based on the first included angle and the second included angle, to instruct a user to adjust the first display or the second display.

14. The device according to claim 8, wherein the screenshot display method further comprises:
   constructing a first timeline corresponding to the first included angle and a second timeline corresponding to the first screenshot and the second screenshot, wherein the first timeline corresponds to the second timeline; and
   displaying the first screenshot and the second screenshot based on the first included angle comprises:
   obtaining the first screenshot and the second screenshot based on the second timeline, and obtaining, based on the first timeline, the first included angle corresponding to the first screenshot and the second screenshot.

15. A non-volatile computer-readable storage medium storing a computer program, when the computer program is executed by a processor, a terminal including the processor performs a method of:
   obtaining a first included angle between the first display and the second display, and performing a screen capturing operation on currently displayed content of each of the first display and the second display, to obtain a first screenshot corresponding to the first display and a second screenshot corresponding to the second display; and
   displaying the first screenshot on the first display and the second screenshot on the second display based on the first included angle by
   obtaining, based on the first included angle, a three-dimensional model corresponding to the terminal device, wherein the three-dimensional model comprises a first display area corresponding to the first display and a second display area corresponding to the second display, and a second included angle between the first display area and the second display area is the same as the first included angle,
   rendering the first screenshot to the first display area of the three-dimensional model, and rendering the second screenshot to the second display area of the three-dimensional model, and
   displaying the three-dimensional model.

16. The computer-readable storage medium according to claim 15, wherein displaying the first screenshot and the second screenshot based on the first included angle comprises:
   determining, based on the first included angle, a first plane corresponding to the first screenshot and a second plane corresponding to the second screenshot, wherein a second included angle between the first plane and the second plane is the same as the first included angle;
   separately determining a first plane area in the first plane and a second plane area in the second plane based on the first display and the second display; and
   displaying the first screenshot in the first plane area, and displaying the second screenshot in the second plane area.

17. The computer-readable storage medium according to claim 15, wherein displaying the first screenshot in the first plane area, and displaying the second screenshot in the second plane area comprises:
   determining a first display location of the first screenshot in the first display area based on first location information of the first screenshot in the first display;
   determining a second display location of the second screenshot in the second plane area based on second location information of the second screenshot in the second display; and
   displaying the first screenshot in the first display location, and displaying the second screenshot in the second display location.

18. The computer-readable storage medium according to claim 15, wherein displaying the three-dimensional model comprises:
   determining a display angle corresponding to the three-dimensional model, and displaying the three-dimensional model based on the display angle.

19. The computer-readable storage medium according to claim 15, wherein displaying the first screenshot and the second screenshot based on the first included angle comprises:
   obtaining attribute information corresponding to the terminal device; and
   drawing, based on the attribute information and the first included angle, the three-dimensional model corresponding to the terminal device.

20. The computer-readable storage medium according to claim 15, wherein displaying the first screenshot and the second screenshot based on the first included angle comprises:
   obtaining a second included angle between the first display and the second display; and if the second included angle is the same as the first included angle, displaying the first screenshot in the first display, and displaying the second screenshot in the second display; or if the second included angle is different from the first included angle, outputting an adjustment instruction based on the first included angle and the second included angle, to instruct a user to adjust the first display or the second display.

\* \* \* \* \*